(No Model.)
S. FRALEIGH.
INDICATOR FOR RESERVOIRS.
No. 354,508. Patented Dec. 14, 1886.
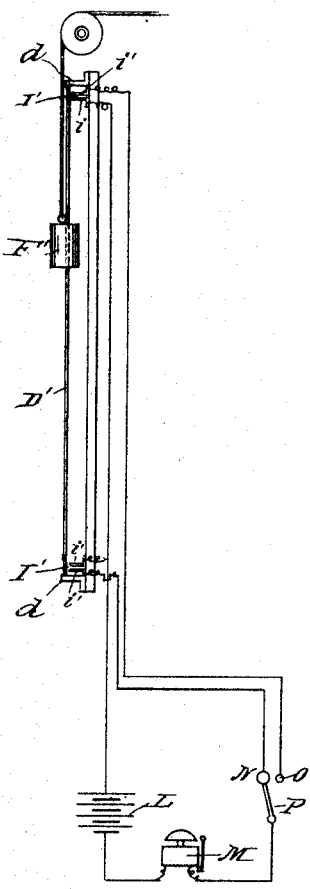
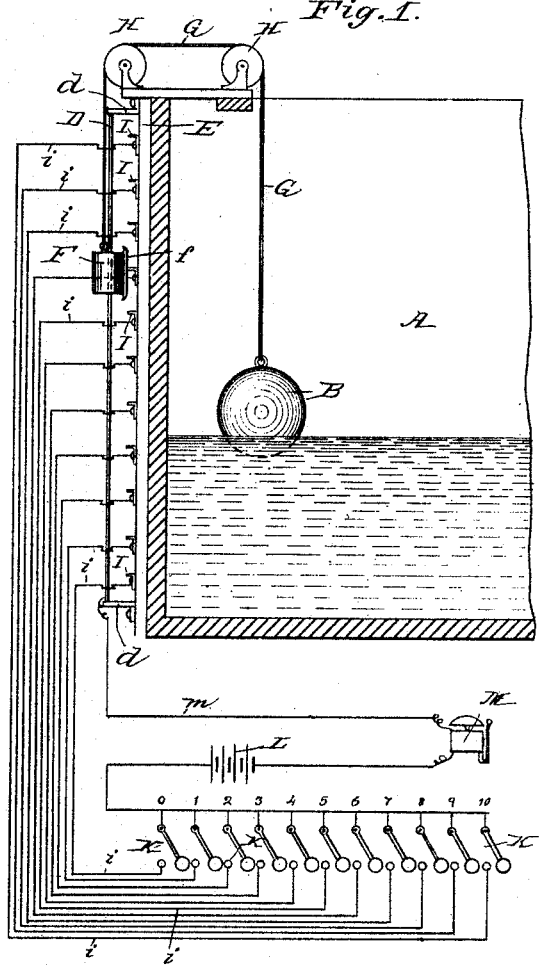
Attest:
George B. Wilton.
Altmas Best
Inventor
Solomon Fraleigh
By Andrew S. Steyer
Atty:

UNITED STATES PATENT OFFICE.

SOLOMON FRALEIGH, OF NEWARK, NEW JERSEY, ASSIGNOR OF ONE-HALF TO ALEXANDER BRYANT, OF NEW YORK, N. Y.

INDICATOR FOR RESERVOIRS.

SPECIFICATION forming part of Letters Patent No. 354,508, dated December 14, 1886.

Application filed May 13, 1886. Serial No. 202,056. (No model.)

*To all whom it may concern:*

Be it known that I, SOLOMON FRALEIGH, a citizen of the United States, and a resident of Newark, in the county of Essex and State of New Jersey, have invented certain new and useful Improvements in Indicators for Reservoirs, of which the following is a specification.

My invention relates to an electrical telltale or indicator for use with tanks or reservoirs for storing fluid, and is for the purpose of indicating the level of the fluid within the said tank.

It consists, as hereinafter more fully set forth, in causing a float within the tank, as it is raised or lowered by the fluid, to automatically close a series of electrical circuits, each circuit operating an indicating device, and indicating thereby a certain level of fluid within the reservoir or tank.

In the accompanying drawings, Figure 1 is a sectional view of a part of a tank or reservoir having my improved indicator connected therewith, and Fig. 2 shows a modification in the construction of the indicator mechanism.

A is a reservoir for holding fluids.

B is a float, preferably in the form of a hollow sphere, as shown.

D is a vertical metallic rod sustained between brackets $d\ d$, attached directly to the sides of the reservoir or to a strip, E, which may be secured in any convenient location adjacent to the reservoir.

F is a weight perforated and sliding upon the vertical rod D. The weight F is connected by a flexible cord or chain, G, to the float B, said cord or chain passing over one or more pulleys, H H, in such manner as that when the float B is raised by the fluid within the reservoir from the bottom to the top of said reservoir the weight will slide down over the rod D from top to bottom.

I I I are a series of metallic contact-points arranged in a line parallel with the vertical rod D, and at such a distance therefrom as that the weight F as it moves along the said rod D will make electrical contact with each as it passes.

Upon the side of the weight F, I prefer to secure a metallic contact-strip, $f$, to contact with the points I I, though the weight itself may be made of conducting material and the strip $f$ dispensed with. This strip $f$ is prefer- ably made of such a length as that it will extend from point to point, so that a connection may at all times be maintained. The contact-points I I are each connected through a conductor, $i$, with one arm of a switch, K, these switches of the several circuits being placed in a convenient location for observation, and numbered or lettered to indicate which circuit they are in. The remaining arms of the switches are connected together, and through an electric generator, L, an alarm-bell, M, and to the vertical guide-rod D through a conductor, $m$.

In use, if it is desired to know the height of the fluid in the reservoir, the switches K may be successively closed, and when the switch connected with the contact-point which is opposite to and in connection with the weight F is closed the alarm will be sounded. Ordinarily the switches connected, respectively, with the upper and the lower contacts are left closed, so that if the tank is being filled or emptied the alarm will indicate when the limit has been reached.

In certain instances it is only required to indicate when the reservoir is full or empty, and in these cases I may construct the contact mechanism as shown in Fig. 2, wherein D' is the vertical guide-rod, and F' the weight connected over pulleys, as before described, with the float. I' I' are push-contacts arranged one at each end of the rod D', and composed of parallel spring-arms $i'\ i'$, projecting into the path of the weight F' as it moves along the rod D'. One branch of each push-contact I' is connected through an independent conductor, respectively, with contacts N and O at the observing-station. A common switch-arm, P, is made to swing back and forth over these contacts N O, and is connected through an alarm-bell, M, and battery L to the remaining arms of the two push-contacts I' I'. In using the device as thus constructed, the arm P should make connection with the contact N when the reservoir is being filled, and with O when the reservoir is being emptied.

I do not wish to confine myself to the particular construction of the guide for the sliding weight, as there are various ways in which the weight may be guided to make the proper contacts without departing from my invention.

What I claim is—

1. In an indicator for reservoirs, the combination, with a float within said reservoir, of a vertically-sliding weight moved by said float as the latter is raised or lowered by the fluid in the reservoir, and two or more electric circuits adapted to be successively closed by the weight as it is moved and to indicate the height of the fluid within the reservoir, all as and for the purpose set forth.

2. In an indicator for reservoirs, the combination, with a sliding weight moved by a float within the reservoir, of a series of two or more open electric circuits adapted to be successively closed by said weight as it moves, and means, substantially such as described, to indicate at any given time which circuit is so closed, all as set forth.

3. In an indicator for reservoirs, the combination of the float B, weight F, guide D, contacts I I, conductors $i\ i$, switches K, battery L, and alarm M, all as and for the purpose set forth.

Signed at New York, in the county of New York and State of New York.

SOLOMON FRALEIGH.

Witnesses:
ANDREW W. STEIGER,
G. A. ATKINS.